US012525008B2

(12) United States Patent
Dorkenwald et al.

(10) Patent No.: US 12,525,008 B2
(45) Date of Patent: Jan. 13, 2026

(54) OBJECT DETECTION USING VISUAL LANGUAGE MODELS VIA LATENT FEATURE ADAPTATION WITH SYNTHETIC DATA

(71) Applicant: QUALCOMM Technologies, Inc., San Diego, CA (US)

(72) Inventors: Michael Dorkenwald, Amsterdam (NL); Yuki Asano, Amsterdam (NL)

(73) Assignee: QUALCOMM Technologies, Inc., San Diego, CA (US)

( * ) Notice: Subject to any disclaimer, the term of this patent is extended or adjusted under 35 U.S.C. 154(b) by 138 days.

(21) Appl. No.: 18/607,159

(22) Filed: Mar. 15, 2024

(65) Prior Publication Data

US 2025/0166367 A1 May 22, 2025

Related U.S. Application Data

(60) Provisional application No. 63/599,947, filed on Nov. 16, 2023.

(51) Int. Cl.
*G06V 10/86* (2022.01)
*G06T 7/73* (2017.01)
(Continued)

(52) U.S. Cl.
CPC ................ *G06V 10/86* (2022.01); *G06T 7/73* (2017.01); *G06T 11/60* (2013.01); *G06V 10/40* (2022.01);
(Continued)

(58) Field of Classification Search
CPC ...... G06V 10/86; G06V 10/40; G06V 10/774; G06V 10/82; G06T 7/73; G06T 11/60;
(Continued)

(56) References Cited

U.S. PATENT DOCUMENTS

2021/0264203 A1* 8/2021 Fuxman .................. G06F 18/24
2025/0037424 A1* 1/2025 Uziel .................. G06V 10/764
(Continued)

FOREIGN PATENT DOCUMENTS

EP 4546213 A1 * 4/2025 ............... G06N 3/08

OTHER PUBLICATIONS

Dorkenwald M., et al., "PIN: Positional Insert Unlocks Object Localisation Abilities in VLMs", 2024 IEEE/CVF Conference on Computer Vision and Pattern Recognition (CVPR), IEEE, Jun. 16, 2024, pp. 13548-13558, XP034696525, the whole document.
(Continued)

*Primary Examiner* — Maurice L. McDowell, Jr.
(74) *Attorney, Agent, or Firm* — QUALCOMM Technologies, Inc.; Espartaco Diaz Hidalgo

(57) ABSTRACT

Systems and techniques are described herein for adapting a pretrained machine learning model. For instance, a process can include encoding a training image into a first feature vector, the training image including a first object located at a first location; generating a second feature vector based on a set of sinusoidal functions using a set of weights; combining the first feature vector with a second feature vector to generate a combined feature vector; processing the combined feature vector using a visual language model to obtain a second location for the first object; and adjusting the set of weights based on a comparison between the first location and the second location.

20 Claims, 12 Drawing Sheets

(51) Int. Cl.
*G06T 11/60* (2006.01)
*G06V 10/40* (2022.01)
*G06V 10/774* (2022.01)
*G06F 40/58* (2020.01)

(52) U.S. Cl.
CPC ............ *G06V 10/774* (2022.01); *G06F 40/58* (2020.01); *G06T 2207/20081* (2013.01); *G06T 2207/20084* (2013.01)

(58) Field of Classification Search
CPC . G06T 2207/20081; G06T 2207/20084; G06F 40/58
See application file for complete search history.

(56) References Cited

U.S. PATENT DOCUMENTS

2025/0094482 A1* 3/2025 Najdenkoska .......... G06F 16/55
2025/0118096 A1* 4/2025 Schulter ................. G06V 20/56

OTHER PUBLICATIONS

International Search Report and Written Opinion—PCT/US2024/055577—ISA/EPO—Feb. 18, 2025.

Yao Y., et al., "PEVL: Position-enhanced Pre-training and Prompt Tuning for Vision-language Models", Arxiv.Org, Cornell University Library, 201 Olin Library Cornell University Ithaca, NY 14853, May 23, 2022, XP091230783, 14 Pages, the whole document.

* cited by examiner

OBJECT DETECTION USING VISUAL LANGUAGE MODELS VIA LATENT FEATURE ADAPTATION WITH SYNTHETIC DATA

CROSS-REFERENCE TO RELATED APPLICATIONS

This application claims the benefit of U.S. Provisional Patent Application No. 63/599,947, filed Nov. 16, 2023, which is hereby incorporated by reference, in its entirety and for all purposes.

FIELD

The present disclosure generally relates to object detection. For example, aspects of the present disclosure are related to systems and techniques for performing object detection using a visual language model through latent feature adaptation with synthetic data.

BACKGROUND

Visual language models (VLMs) are artificial intelligence/machine learning (AI/ML) models which are designed to process visual content, such as images, video, etc., to learn to recognize and classify visual elements, such as objects, scenes, styles and so forth, and generate text based on the visual content. As an example, a VLM may be able to classify visual elements in visual content or answer questions about visual content, for example, when combined with a large language model (LLM).

An LLM is an example of an ML model which is trained to perform natural language processing tasks, such as generating, predicting, translating, etc. text. In some cases, LLMs may be implemented using neural networks (NN) and/or transformer models. A transformer model is a type of ML model which includes an encoder and decoder and may be used to tokenize inputs, learn relationships between the tokens, and then generate predictions using the tokens. As an example, a VLM may be able to generate textual output indicating what objects are in an image, or generate an image based on textual input.

However, while a VLM may be able to indicate that an image has a certain object in the image, VLMs generally have difficulties indicating where in the image the object is. For example, a VLM may be able to indicate that an image includes a dog but the VLM may not be able to localize the dog to indicate that the dog is in the lower left corner (e.g., in a box between pixels ($X_1$, $Y_1$) and ($X_2$, $Y_2$). This localization task may be a part of the computer vision task of object detection. In some cases, techniques to allow existing VLM models (e.g., pretrained VLM models without retraining) to perform object detection may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for herein for performing object detection using a visual language model through latent feature adaptation with synthetic data.

In one illustrative example, an apparatus for adapting a pretrained machine learning model is provided. The apparatus includes: one or more memories; and one or more processors coupled to the one or more memories and configured to: encode a training image into a first feature vector, the training image including a first object located at a first location; generate a second feature vector based on a set of sinusoidal functions using a set of weights; combine the first feature vector with a second feature vector to generate a combined feature vector; process the combined feature vector using a visual language model to obtain a second location for the first object; and adjust the set of weights based on a comparison between the first location and the second location.

As another example, a method for adapting a pretrained machine learning model is provided. The method includes: encoding a training image into a first feature vector, the training image including a first object located at a first location; generating a second feature vector based on a set of sinusoidal functions using a set of weights; combining the first feature vector with a second feature vector to generate a combined feature vector; processing the combined feature vector using a visual language model to obtain a second location for the first object; and adjusting the set of weights based on a comparison between the first location and the second location.

In another example, a non-transitory computer-readable medium having stored thereon instructions is provided. The instructions, when executed by one or more processors, cause the one or more processors to: encode a training image into a first feature vector, the training image including a first object located at a first location; generate a second feature vector based on a set of sinusoidal functions using a set of weights; combine the first feature vector with a second feature vector to generate a combined feature vector; process the combined feature vector using a visual language model to obtain a second location for the first object; and adjust the set of weights based on a comparison between the first location and the second location.

As another example, an apparatus for adapting a pretrained machine learning model is provided. The apparatus includes: means forencoding a training image into a first feature vector, the training image including a first object located at a first location; means for generating a second feature vector based on a set of sinusoidal functions using a set of weights; means for combining the first feature vector with a second feature vector to generate a combined feature vector; means for processing the combined feature vector using a visual language model to obtain a second location for the first object; and means for adjusting the set of weights based on a comparison between the first location and the second location.

In another example, an apparatus for image processing is provided. The apparatus includes: one or more memories; and one or more processors coupled to the one or more memories and configured to: process an image and a first textual prompt using a visual language model to obtain a list of objects in the image; process the image and a second textual prompt using an adapted visual language model, the second textual prompt including a first object from the list of objects; and receive a set of coordinates for the first object in the image.

As another example, a method for image processing, comprising: processing an image and a first textual prompt using a visual language model to obtain a list of objects in the image; processing the image and a second textual prompt using an adapted visual language model, the second textual prompt including a first object from the list of objects; and receiving a set of coordinates for the first object in the image.

In another example, a non-transitory computer-readable medium having stored thereon instructions is provided. The instructions, when executed by one or more processors, cause the one or more processors to: process an image and a first textual prompt using a visual language model to obtain a list of objects in the image; process the image and a second textual prompt using an adapted visual language model, the second textual prompt including a first object from the list of objects; and receive a set of coordinates for the first object in the image.

As another example, an apparatus for image processing is provided. The apparatus includes: means for processing an image and a first textual prompt using a visual language model to obtain a list of objects in the image; means for processing the image and a second textual prompt using an adapted visual language model, the second textual prompt including a first object from the list of objects; and means for receiving a set of coordinates for the first object in the image.

In some aspects, one or more of the apparatuses described herein comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device of a vehicle), or other device. In some aspects, the apparatus(es) include at least one camera for capturing one or more images or video frames. For example, the apparatus(es) can include a camera (e.g., an RGB camera) or multiple cameras for capturing one or more images and/or one or more videos including video frames. In some aspects, the apparatus(es) can include a display for displaying one or more images, videos, notifications, or other displayable data. In some aspects, the apparatus(es) can include a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

In some cases, a pre-trained VLM with frozen weights (e.g., weights that are not trained during subsequent training processes) may be adapted to perform tasks that the original VLM may not have been capable of. In some cases, general VLMs may be relatively large and substantial computing resources may be used to train the VLMs. As training a VLM from scratch can be expensive with respect to computing resources and time, it may be useful to leverage existing pretrained VLM models with frozen weights to perform localization tasks for object detection.

Systems, apparatuses, electronic devices, methods (also referred to as processes), and computer-readable media (collectively referred to herein as "systems and techniques") are described for object detection using a visual language model through latent feature adaptation with synthetic data. For example, using a pretrained ML model, such as a VLM model, a training image including an object may be encoded into a feature vector. Another vector may be generated based on a set of weights and a set of sinusoidal functions. The set of weights may be a trainable part of a lightweight CNN or other ML model. The vector and the other vector may be combined and submitted to a VLM along with a training prompt. The training prompt may ask for a location of the object in the image. The VLM may generate a result and this result may be compared to the location of the object in the image. The difference between the result and the location of the object in the image may be used to adjust the set of weights.

Various aspects of the present disclosure will be described with respect to the figures.

Figure 1:
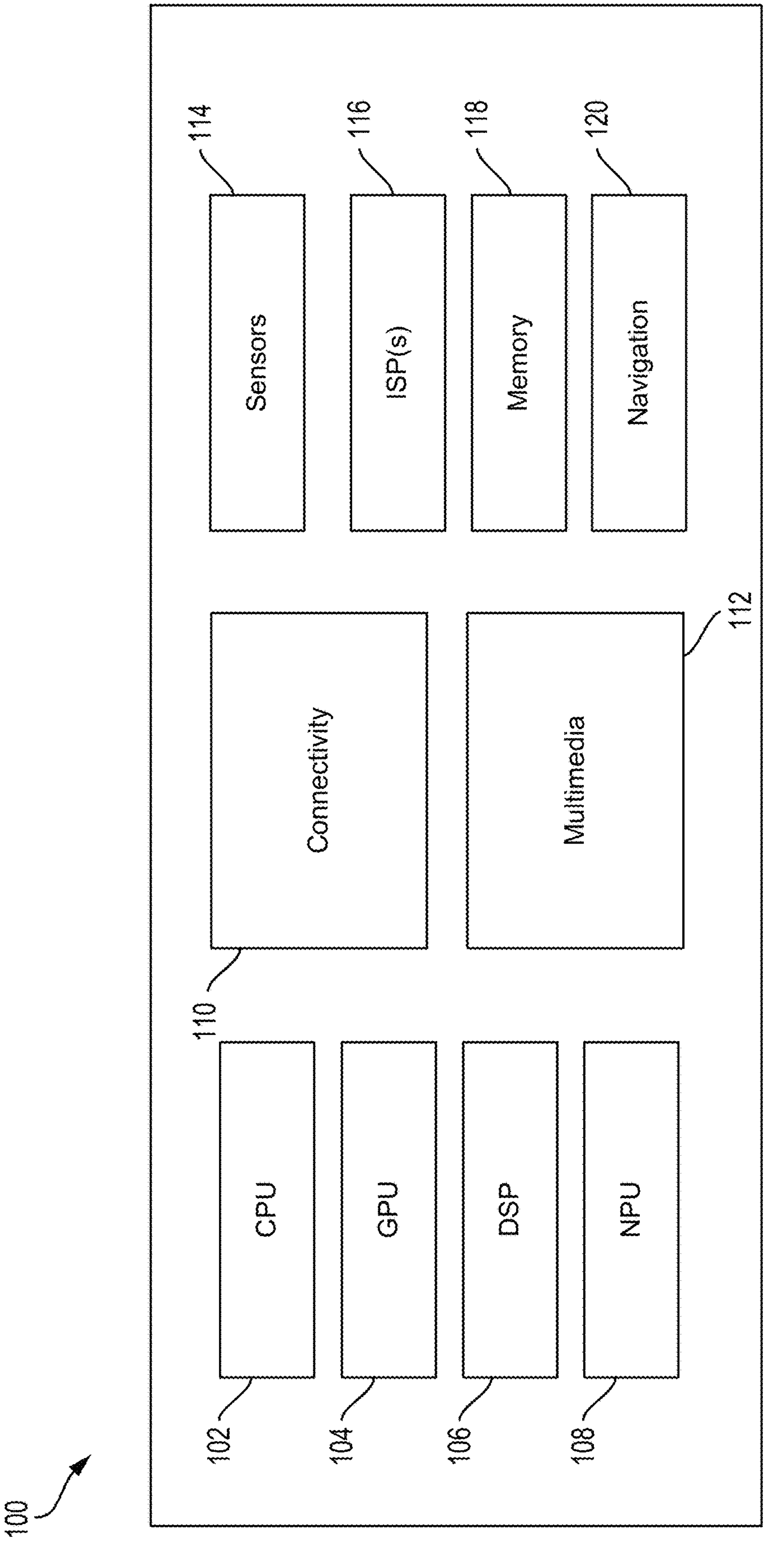
FIG. 1 illustrates an example implementation of a system-on-a-chip (SOC), in accordance with some examples.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. SOC 100 and/or components thereof may be configured to perform segmentation mask extrapolation. For example, the CPU 102, DSP 106, and/or GPU 104 may be configured to perform object detection using a visual language model via latent feature adaptation with synthetic data.

In some cases, a VLM may accept visual data, such as images, video, etc., along with textual data to output text. For example, a VLM may accept visual data as input, such as an image I, which includes a dog, alongside textual input T asking whether there is a cat in the image. The visual data (e.g., image I) may be processed by a vision encoder $\phi_V$ to produce a feature vector $x_v \in \mathbb{R}^{N_p * D_v}$, where $N_p$ denotes the number of patches and $D_v$ the channel dimension. Similarly, the textual information T may be tokenized and embedded to yield textual embeddings $x_t \in \mathbb{R}^{M * D_t}$, where M represents a number of textual tokens and $D_t$ the embedding dimension. The visual features $x_v$ go through a fusion network F before being processed with the textual features $x_t$ to produce a response text $t_r = D(F(\phi), x_t)$ indicating that there is no cat in the image by the language decoder D.

In some cases, a generalist VLM may be relatively large and substantial computing resources may be used to train the VLM. As training a VLM from scratch can be expensive with respect to computing resources and time, it may be useful to leverage existing pretrained VLM models with frozen weights to perform localization tasks for object detection. For example, learned parameters may be used to adapt features of a frozen, pretrained VLM to perform localization tasks for object detection.

In some cases, a pre-trained VLM (e.g., VLM with frozen weights) may be adapted to perform tasks that the original VLM may not have been capable of. For example, a VLM that has been pre-trained on general data may support low rank adaptation (LoRA). In LoRA, a pre-trained, frozen, model (e.g., ML model with frozen weights) may include trainable matrices in layers of the ML model that allow the ML model to be adapted to different tasks. In some cases, these trainable matrices may be trained to support localization tasks.

Figure 2:
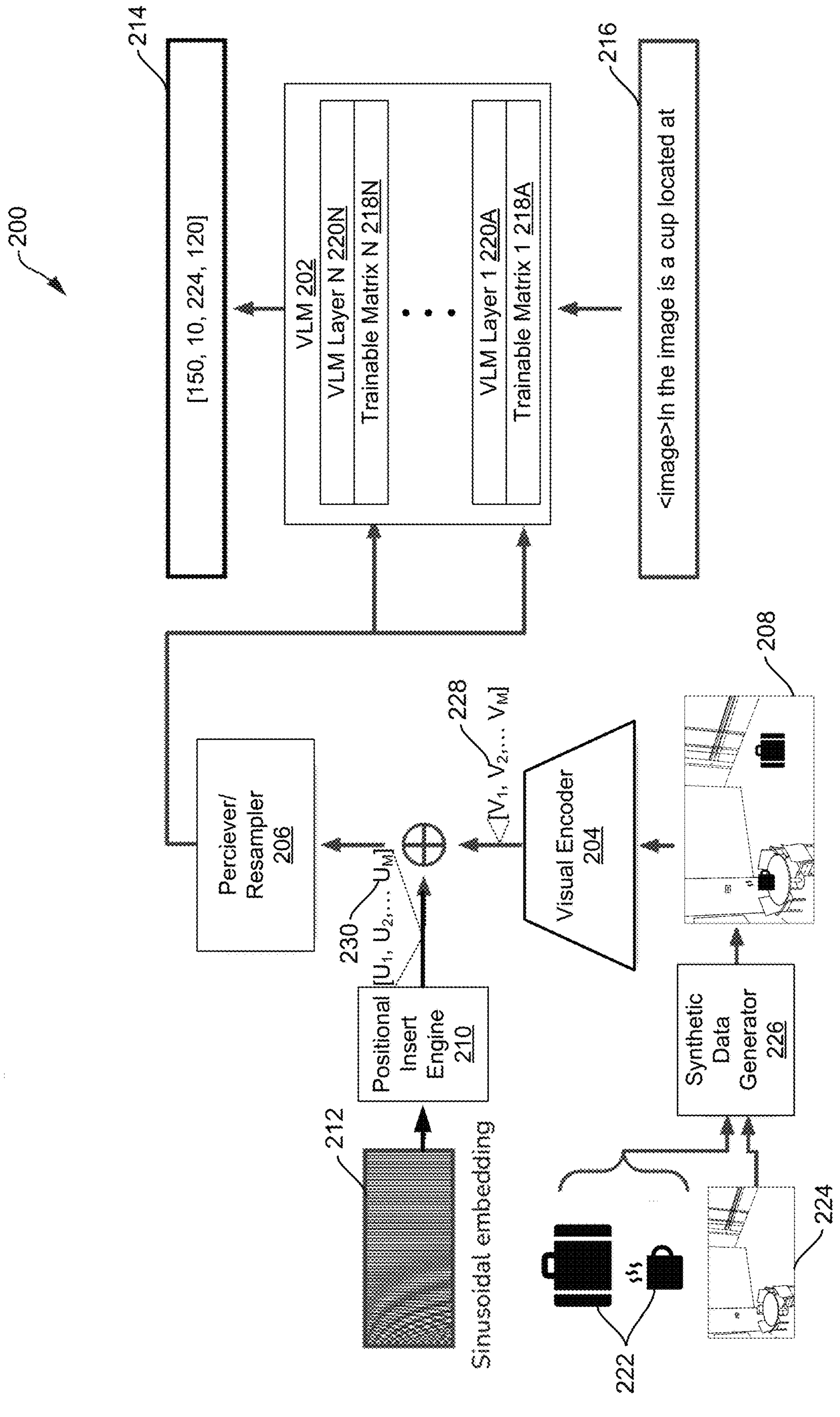
FIG. 2 is a block diagram illustrating a technique for adapting a VLM to perform object detection using latent feature adaption, in accordance with aspects of the present disclosure.

FIG. 2 is a block diagram illustrating a technique 200 for adapting a VLM to perform object detection using latent feature adaption, in accordance with aspects of the present disclosure. As shown in FIG. 2, a pretrained VLM 202 may also include a visual encoder 204 $\phi$ and a perceiver/resampler 206 for LoRA. Examples of VLMs may include Flamingo, CLIP, VisualBert, etc. The VLM 202 can include VLM layer 1 220A through VLM Layer N 220N and trainable matrix 1 218A through trainable matrix N 218N. The VLM 202 may be pretrained for a general task, such as to generate textual descriptions of whether a certain object is in an image and the VLM 202 may implement LoRA to allow the VLM 202 to be adapted to perform other tasks.

The perceiver/resampler 206 may recompute received feature vectors into a size and/or format that is compatible with the VLM 202 to adapt the VLM 202 to specific tasks. The visual encoder 204 $\phi$ may be used to encode received images 208 into a feature vector 228 of tokens (e.g., first feature vector). The feature vector 228 of tokens from the visual encoder 204 may be combined with a spatial feature vector 230 (e.g., second feature vector) from a positional insert engine (PIE) 210.

The PIE 210 may be a multi-layer perceptron (MLP) trained to learn an input-agnostic spatial feature vector 230 that may be combined with the feature vector 228 of tokens output of the visual encoder 204 #. To instill spatial awareness into the PIE 210, fixed positional embeddings (e.g., sinusoidal embeddings 212) may be used. In some cases, the sinusoidal embeddings 212 may be based on sine and cosine functions of a position. For example, sinusoidal embeddings 212 may have a dimension d and employ sinusoidal functions:

$$S[i, 2k] = \sin\left(\frac{\text{position}}{10000^{2k/d}\text{model}}\right), \quad \text{[Equation 1]}$$

$$S[i, 2k+1] = \cos\left(\frac{\text{position}}{10000^{2k/d}\text{model}}\right), \quad \text{[Equation 2]}$$

where i denotes the index of the position and k represents the index within the dimension of the embedding, with $d_{model}$ as the dimensionality of the embedding space. The range for k extends from 1 to $d_{model}$. The sinusoidal embedding 212 acts to indicate to the PIE 210 where in the features space (e.g., of the feature vector of tokens from the vision encoder 204 the PIE 210) to generate the spatial feature vector 230. The sinusoidal embedding 212 may help limit a size of the PIE 210 when dealing with higher dimension vectors, such as a feature vector 228 of tokens for an image (e.g., greater than approximately 10 dimensions) from the vision encoder 204. The PIE 210 may then learn the output of the sinusoidal embedding 212 and may tune the spatial feature vector 230 (e.g., spatial sinusoidal vector) so that the VLM 202 may understand to output text describing a bounding box for an object <obj>, such as objects 222.

In some cases, the spatial feature vector 230 generated by the PIE 210 may be refined by a learnable, shallow feed-forward neural network $\psi$, resulting in $v_P=\psi(S)$ with the output dimension matching the ones from the vision encoder $x_p \in \mathbb{R}^{M*D_t}$. This learned spatial feature $\mathbb{R}$ vector 230 may then be added to the output from the visual encoder 204 $\phi(I)$, resulting in an enriched visual feature representation $x^*_v=\phi(I)+v_p$. The feed-forward neural network $\psi$ may be trained during learning based on a set of weights that may be adjusted as a part of training the PIE 210. The output of the PIE 210 may be independent of the received images 208 and deterministic.

In some cases, the PIE 210 parameters $\theta$ of $\psi$ may be optimized via the text output 214 produced by the language decoder. In some cases, the text output 214 may correspond to a textual output of coordinates for a bounding box around a predicted location of an object being localized. This process requires no additional heads or projection layers, thus maintaining the VLM's simplicity and native natural language output. For example, the PIE 210 may be trained with an input sequence 216 consisting of a textual prompt $tp \in T$ such as 'In the image is a <obj> located at' to the VLM 202 and the VLM 202 may be tasked to complete the sequence with the bounding box coordinates for the given object name <obj>, such as a cup. For a given object name <obj>, present within the image, the VLM may predict a sequence of bounding box coordinates in the template of $t_r \in T$ like $[x_{min}, y_{min}, x_{max}, y_{max}]$ conditioned on the image features and the initial textual prompt.

As a part of training, the predicted sequence of bounding box coordinates may be compared to expected locations of the bounding box based on a loss and this loss may be used to adjust the weights of the feed-forward neural network $\psi$ of the PIE 210. In some cases, a negative log-likelihood loss for the predicted tokens may be used. The negative log-likelihood may be $$\mathcal{L}(\theta) = -\sum_{t=1}^{T} \log p_\theta(y_t | y_{<t}, x_v^*),$$

where $y_t$ corresponds to the target token at position t in the text, T is the total number of tokens to be predicted and v* is the positional enhanced feature vector. Here, $p_\theta$ is the probability assigned by the model to the correct token at position t, conditioned on the previous tokens $y_{<t}$, the visual features, and the textual prompt. This learning objective helps enable adaption of pretrained VLMs for localization without a dependency on specialized components like region proposal networks. In some cases, the VLM 202 may be trained for localization using synthetic data and the received image 208 may be synthetic image for training. In some cases, the synthetic image may be generated by inserting objects 222 into other images 224 using a synthetic data generator 226.

Figure 3:
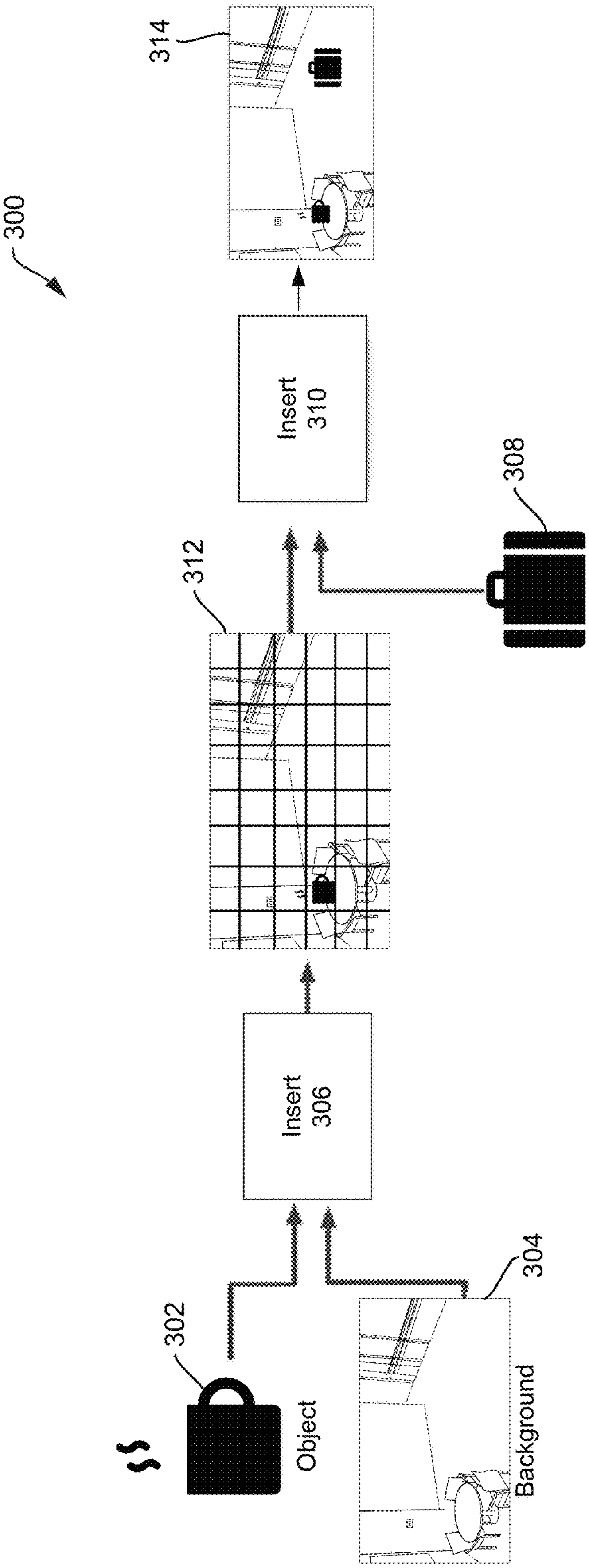
FIG. 3 is a block diagram illustrating generation of synthetic data, in accordance with aspects of the present disclosure.

FIG. 3 is a block diagram illustrating generation of synthetic data 300, in accordance with aspects of the present disclosure. As shown in FIG. 3, an object 302 may be generated, for example, using a text-to-image generation model, such as stable diffusion, based on a list of objects, such as a large vocabulary instance segmentation (LVIS) dataset list of object categories. An object prompt (e.g., an object category, such as "suitcase" or "cup") may be obtained from the LVIS dataset list of object categories and submitted to the text-to-image generation model to generate an image of the object 302.

In some cases, implausible objects (e.g., where the generated object does not match the object prompt) may be sorted out. For example, images may be submitted to a contrastive language image pretraining (CLIP) ML model. The CLIP ML model may take an image, such as the image of the object, along with text, such as the object prompt and output a score indicating how relevant the text is to the object prompt. If the score does not reach threshold score, the image of the object may be discarded. If the score reaches the threshold, the image of the object may be used for training.

The object 302 may be randomly inserted at block 306, based on a grid overlayed on a background image 304, resulting in image 312. In some cases, the background image 304 may be a randomly picked image of a location. Additional objects 308 may also be inserted at block 310 to generate a composite image 314. Thus, a composition function C may return the composite image 314 by overlaying objects in randomly picked locations of the background image 304 while considering the aspect ratio of objects r, $s_{min}$ minimal and $x_{max}$ maximal size, a amount of objects, and the maximal overlap $o_{max}$ with respect to already inserted objects while also returning text containing the location information. Given a background image 304 $I_b \in I$, the composition function yields $$(t_p, I_p)=C(I_b, r, a, s_{min}, s_{max}, o_{max})$$

where the textual prompt $t \in T$ includes the object location for the randomly selected object by C and $I_p \in I$ the overlayed image. This process creates a self-generated supervision signal that may be used to train the PIE 210 of FIG. 2.

In some cases, training of a machine learning network (e.g., such as the PIE 210 of FIG. 2, among various other machine learning networks) can be performed using online training, offline training, and/or various combinations of online and offline training. In some cases, online may refer to time periods during which the input data (e.g., such as the received images 208, input sequence 216 of FIG. 2, etc.) is processed, for instance for performance of the bounding box prediction processing implemented by the systems and techniques described herein. In some examples, offline may refer to idle time periods or time periods during which input data is not being processed. Additionally, offline may be based on one or more time conditions (e.g., after a particular amount of time has expired, such as a day, a week, a month, etc.) and/or may be based on various other conditions such as network and/or server availability, etc., among various others. In some aspects, offline training of a machine learning model (e.g., a neural network model) can be performed by a first device (e.g., a server device) to generate a pre-trained model, and a second device can receive the trained model from the second device. In some cases, the second device (e.g., a mobile device, an XR device, a vehicle or system/ component of the vehicle, or other device) can perform online (or on-device) training of the pre-trained model to further adapt or tune the parameters of the model.

Figure 4:
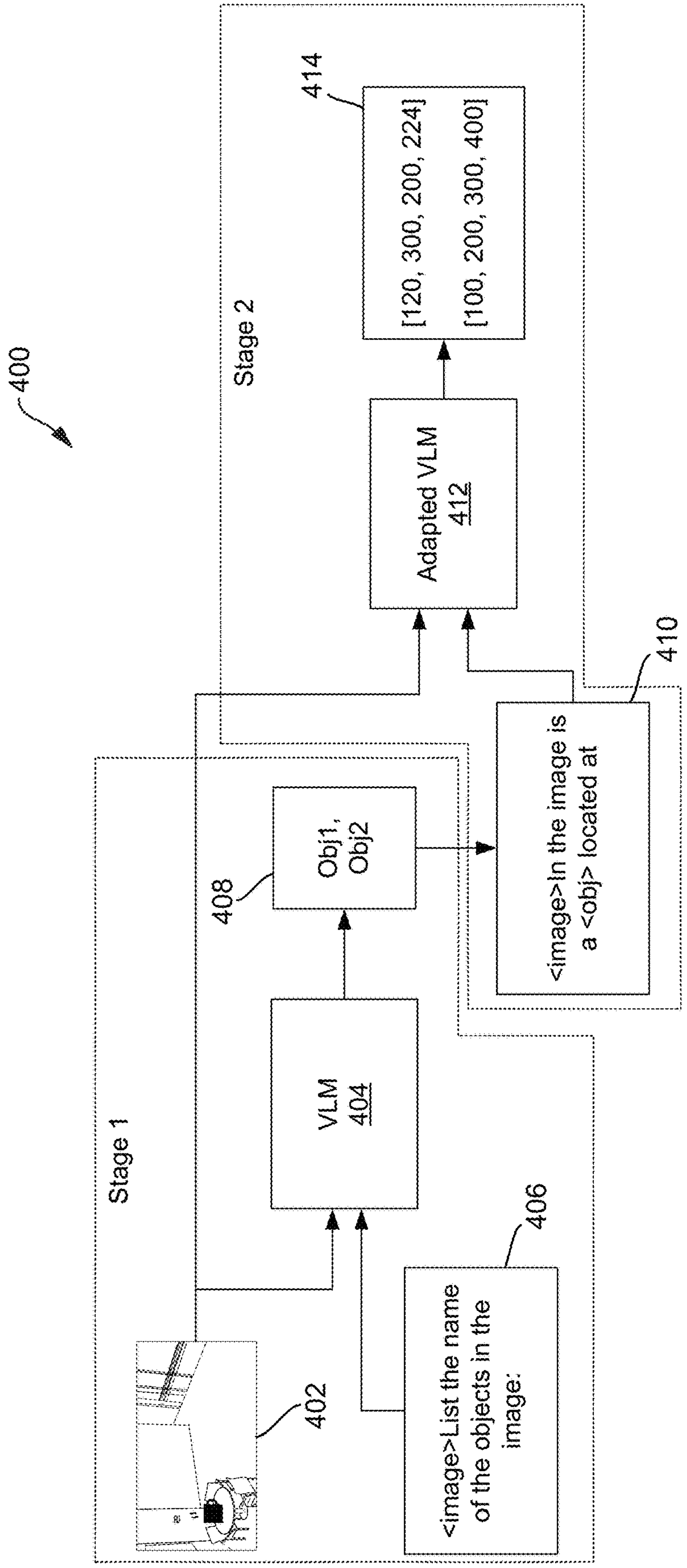
FIG. 4 is a block diagram illustrating use of an adapted VLM for object detection, in accordance with aspects of the present disclosure.

FIG. 4 is a block diagram illustrating use of an adapted VLM for object detection 400, in accordance with aspects of the present disclosure. As shown in FIG. 4, an input image 402 may be input to a VLM 404 along with textual input 406 to cause the VLM 404 to generate a list of the objects 408 that may be found in the input image 402. The VLM 404 may be an unadapted version of the VLM 404. The output list of objects 408 may be used to populate textual input 410 for an adapted version of the VLM (e.g., adapted VLM 412). For example, one or more objects in the list of objects 408 may be selected and inserted into the textual input 410. In some cases, the adapted VLM 412 may be the same as VLM 404 and one or more parameters, settings, input values, etc. may be used to indicate that an adapted version of VLM 404 may be used. The textual input 410 may be input to the adapted VLM 412 to obtain bounding box location information 414 for the one or more objects indicated in the textural input 410.

Figure 5:
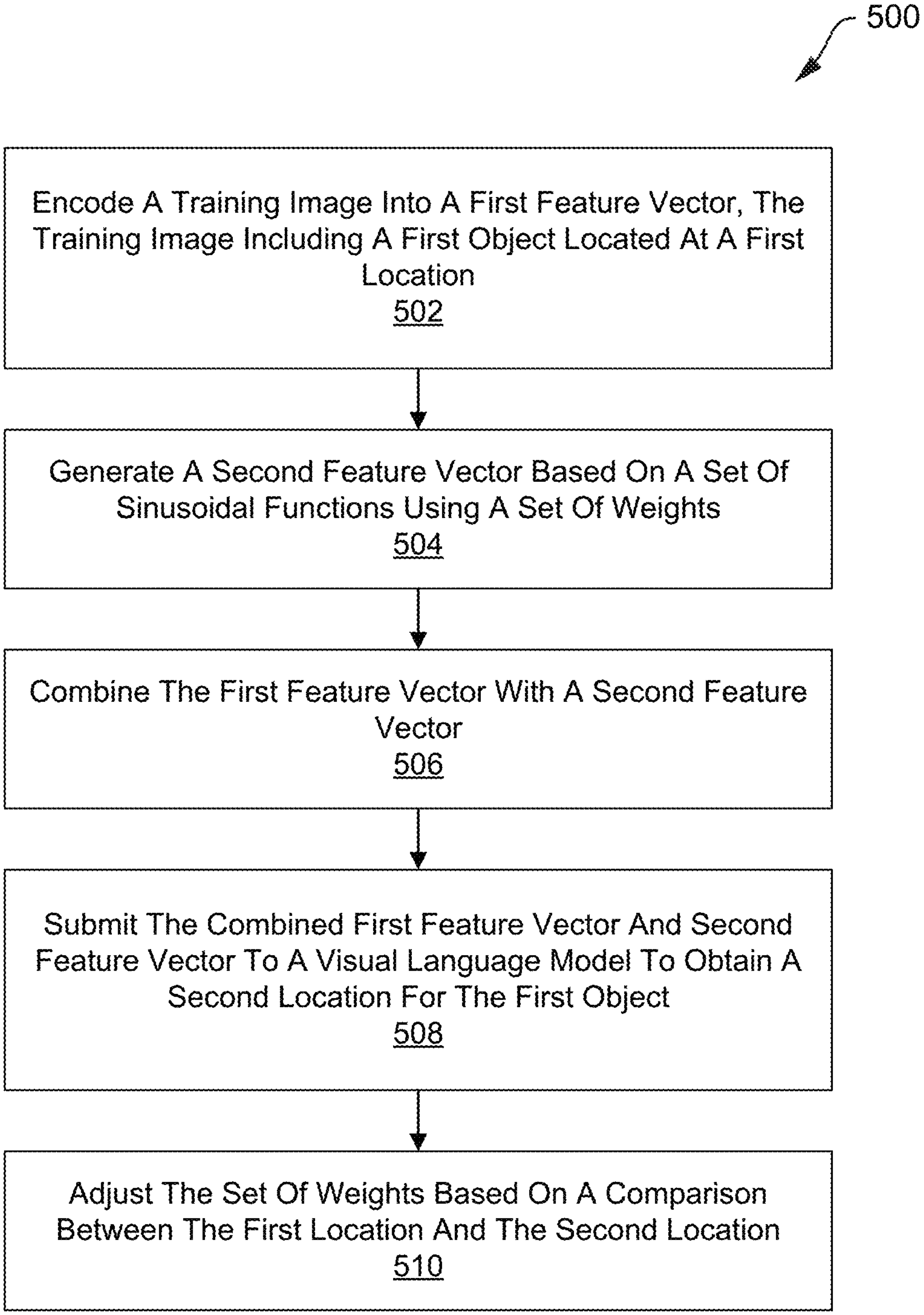
FIG. 5 is a flow diagram illustrating a process for adapting a pretrained ML model, in accordance with aspects of the present disclosure.

FIG. 5 is a flow diagram illustrating a process 500 for adapting a pretrained ML model, in accordance with aspects of the present disclosure. The process 500 may be performed by a computing device (or apparatus) (e.g., SOC 100 of FIG. 1, computing device architecture 1200 of FIG. 12) or a component (e.g., a chipset, codec, CPU 102, GPU 104, DSP 106, NPU 108 of FIG. 1, processor 1210 of FIG. 12, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 500 may be implemented as software components that are executed and run on one or more processors.

At block 502, the computing device (or component thereof) may encode (e.g., via vision encoder 204 of FIG. 2) a training image into a first feature vector, the training image including a first object (e.g., a suitcase) located at a first location. In some cases, the computing device (or component thereof) may generate the training image. In some examples, the computing device (or component thereof) may generate the training image by inserting the first object into a background image. In some cases, the computing device (or component thereof) may generate the training image by generating an image of the first object. In some cases, the computing device (or component thereof) may generate the image of the first object by submitting an object prompt to a text-to-image generation model.

At block 504, the computing device (or component thereof) may generate a second feature vector (e.g., by the PIE 210 of FIG. 2) based on a set of sinusoidal functions (e.g., Equation 1 and Equation 2) using a set of weights (e.g., of the PIE 210). In some cases, the set of sinusoidal functions include a cosine function and a sine function.

At block 506, the computing device (or component thereof) may combine the first feature vector with a second feature vector to generate a combined feature vector. In some cases, the combined feature vector may be recomputed (e.g., by the perceiver/resampler 206 of FIG. 2) to a different sized vector.

At block 508, the computing device (or component thereof) may process the combined feature vector using a visual language model (e.g., VLM 202 of FIG. 2) to obtain a second location (e.g., text output 214 of FIG. 2, bounding box location information 414 of FIG. 4) for the first object. In some cases, the second location comprises textual coordinates for a bounding box. In some cases, the combined feature vector and a textual prompt (e.g., input sequence 216 of FIG. 2, textual input 410 of FIG. 4) are processed using the visual language model to obtain the second location for the first object. In some examples, the textual prompt comprises a prompt for a location of the first object. In some cases, weights of the visual language model are frozen.

At block 510, the computing device (or component thereof) may adjust the set of weights based on a comparison between the first location and the second location.

Figure 6:
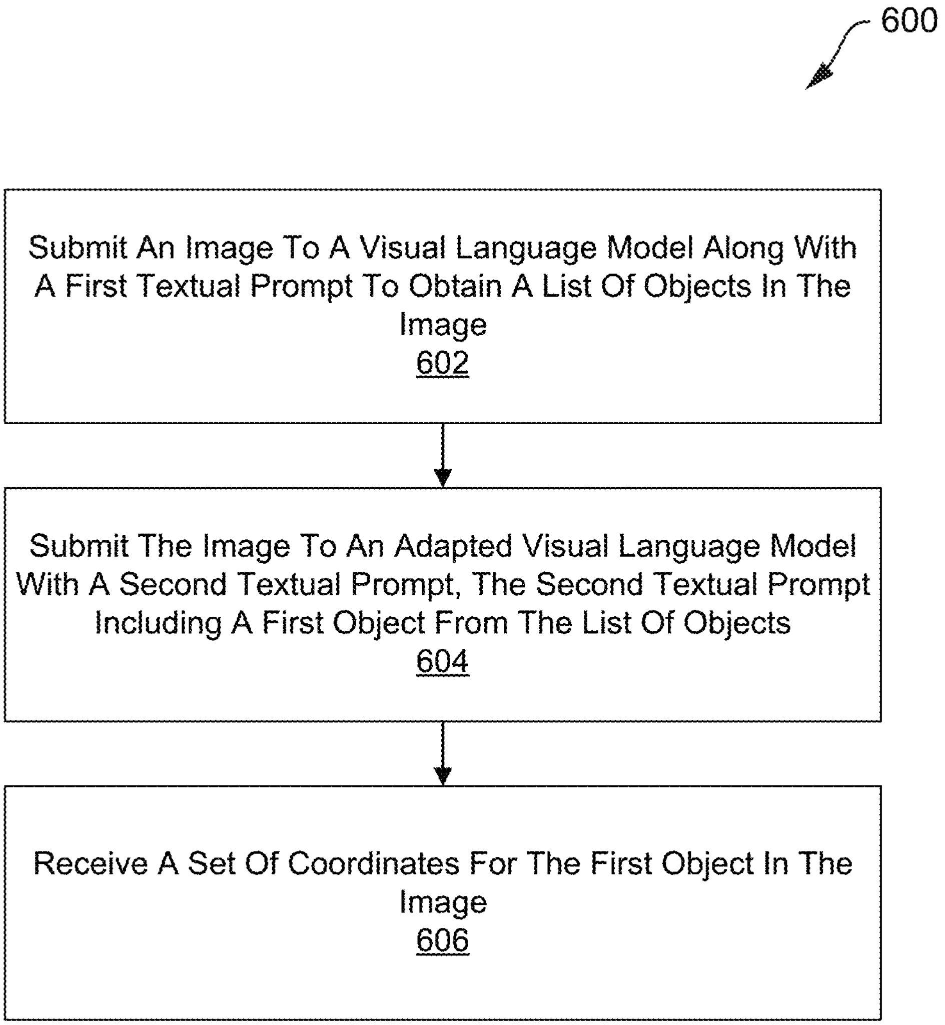
FIG. 6 is a flow diagram illustrating a process for image processing, in accordance with aspects of the present disclosure.

FIG. 6 is a flow diagram illustrating a process 600 for image processing, in accordance with aspects of the present disclosure. The process 600 may be performed by a computing device (or apparatus) (e.g., SOC 100 of FIG. 1, computing device architecture 1200 of FIG. 12) or a component (e.g., a chipset, codec, CPU 102, GPU 104, DSP 106, NPU 108 of FIG. 1, processor 1210 of FIG. 12, etc.) of the computing device. The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 600 may be implemented as software components that are executed and run on one or more processors.

At block 602, the computing device (or component thereof) may process an image (e.g., input image 402 of FIG. 4) and a first textual prompt (e.g., textual input 406 of FIG. 4) using a visual language model (e.g., VLM 404) to obtain a list of objects in the image. In some cases, the first textual prompt comprises a prompt for a list of objects in the image. In some examples, weights of the visual language model are frozen.

At block 604, the computing device (or component thereof) may process the image and a second textual prompt (e.g., textual input 410 of FIG. 4) using an adapted visual language model (e.g., adapted VLM 412 of FIG. 4), the second textual prompt including a first object (e.g., a suitcase) from the list of objects. In some cases, the second textual prompt comprises a prompt for a location of the first object. In some examples, the visual language model and the adapted visual language model are a same machine language model.

At block 606, the computing device (or component thereof) may receive a set of coordinates (e.g., bounding box location information 414 of FIG. 4) for the first object in the image.

In some examples, the techniques or processes described herein may be performed by a computing device or an apparatus, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Machine learning (ML) can be considered a subset of artificial intelligence (AI). ML systems can include algorithms and statistical models that computer systems can use to perform various tasks by relying on patterns and inference, without the use of explicit instructions. One example of an ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in a neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as a feature map or an activation map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multilayer perceptron (MLP) neural networks, transformer neural networks, diffusion-based neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding this output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

Deep learning (DL) is one example of a machine learning technique and can be considered a subset of ML. Many DL approaches are based on a neural network, such as an RNN or a CNN, and utilize multiple layers. The use of multiple layers in deep neural networks can permit progressively higher-level features to be extracted from a given input of raw data. For example, the output of a first layer of artificial neurons becomes an input to a second layer of artificial neurons, the output of a second layer of artificial neurons becomes an input to a third layer of artificial neurons, and so on. Layers that are located between the input and output of the overall deep neural network are often referred to as hidden layers. The hidden layers learn (e.g., are trained) to transform an intermediate input from a preceding layer into a slightly more abstract and composite representation that can be provided to a subsequent layer, until a final or desired representation is obtained as the final output of the deep neural network.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 7:
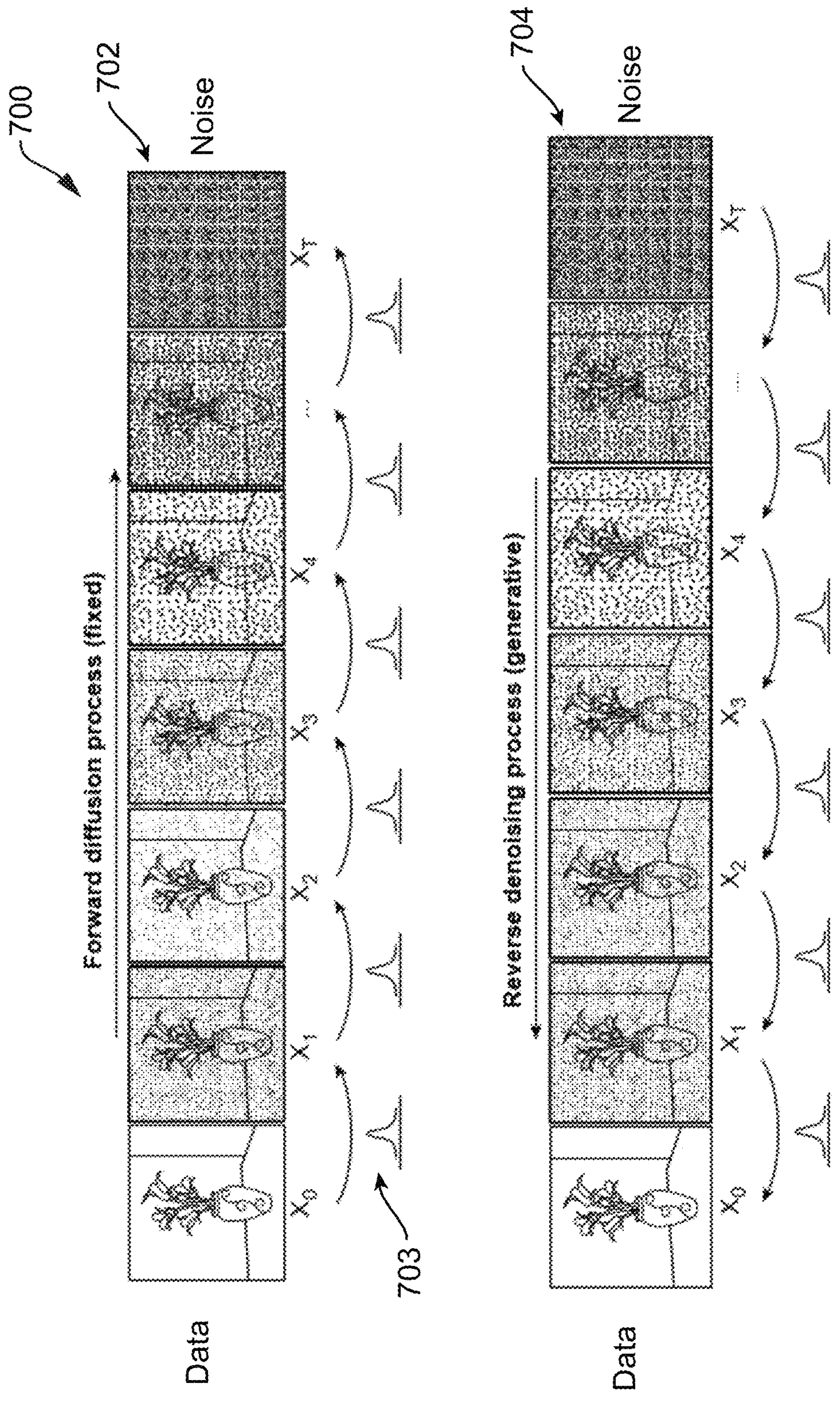
FIG. 7 provides two sets of images that show the forward diffusion process (which is fixed) and the reverse diffusion process (which is learned) of a diffusion model, in accordance with some aspects.

FIG. 7 provides two sets of images 700 that show the forward diffusion process (which is fixed) and the reverse diffusion process (which is learned) of a diffusion model. As shown in the forward diffusion process of FIG. 7, noise 703 is gradually added to a first set of images 702 at different time steps for a total of T time steps (e.g., making up a Markov chain), producing a sequence of noisy samples X1 through XT.

Diffusion models from a training perspective will take an image and will slowly add noise to the image to destroy the information in the image. In some aspects, the noise 703 is Gaussian noise. Each time step can correspond to each consecutive image of the first set of images 702 shown in FIG. 7. The initial image X0 of FIG. 7 is of a cat. Addition of the noise 703 to each image (corresponding to noisy samples X1 to XT) results in gradual diffusion of the pixels in each image until the final image (corresponding to sample XT) essentially matches the noise distribution. For example, by adding the noise, each data sample X1 through XT gradually loses its distinguishable features as the time step becomes larger, eventually resulting in the final sample XT being equivalent to the target noise distribution, for instance a unit variance zero-Gaussian $\mathcal{N}$ (0, 1). $\mathcal{N}$ The second set of images 704 shows the reverse diffusion process in which XT is the starting point with a noisy image (e.g., one that has Gaussian noise). The diffusion model can be trained to reverse the diffusion process (e.g., by training a model pθ(xt−1|xt)) to generate new data. In some aspects, a diffusion model can be trained by finding the reverse Markov transitions that maximize the likelihood of the training data. By traversing backwards along the chain of time steps, the diffusion model can generate the new data. For example, as shown in FIG. 7, the reverse diffusion process proceeds to generate $X_0$ as the image of a vase. In other cases, the input data and output data can vary based on the task for which the diffusion model is trained.

As noted above, the diffusion model is trained to be able to denoise or recover the original image X0 in an incremental process as shown in the second set of images 704. In some aspects, the neural network of the diffusion model can be trained to recover Xt given Xt−1, such as provided in the below example equation:

$$q(x_t|x_{t-1}) = \mathcal{N}\left(x_t; \sqrt{1-\beta_t}\, x_{t-1}, \beta_t I\right).$$

A diffusion kernel can be defined as:

$$\text{Define } \hat{\alpha}_t = \prod_{s=1}^{t} (1-\beta_s) \rightarrow q(x_t|x_0) = \mathcal{N}\left(x_t; \sqrt{\hat{\alpha}_t}\, x_0, (1-\hat{\alpha}_t)I\right)$$

Sampling can be defined as follows:

$$x_t = \sqrt{\hat{\alpha}_t}\, x_0 + \sqrt{1-\hat{\alpha}_t}\, \varepsilon \text{ where } \varepsilon \sim \mathcal{N}(0, I).$$

In some cases, the $\beta_t$ values schedule (also referred to as a noise schedule) is designed such that $\hat{\alpha}_T \rightarrow 0$ and $q(x_T|x_0) \approx \mathcal{N}(x_T; 0, I)$.

The diffusion model runs in an iterative manner to incrementally generate the input image $X_0$. In one example, the model may have twenty steps. However, in other examples, the number of steps can vary.

Figure 8:
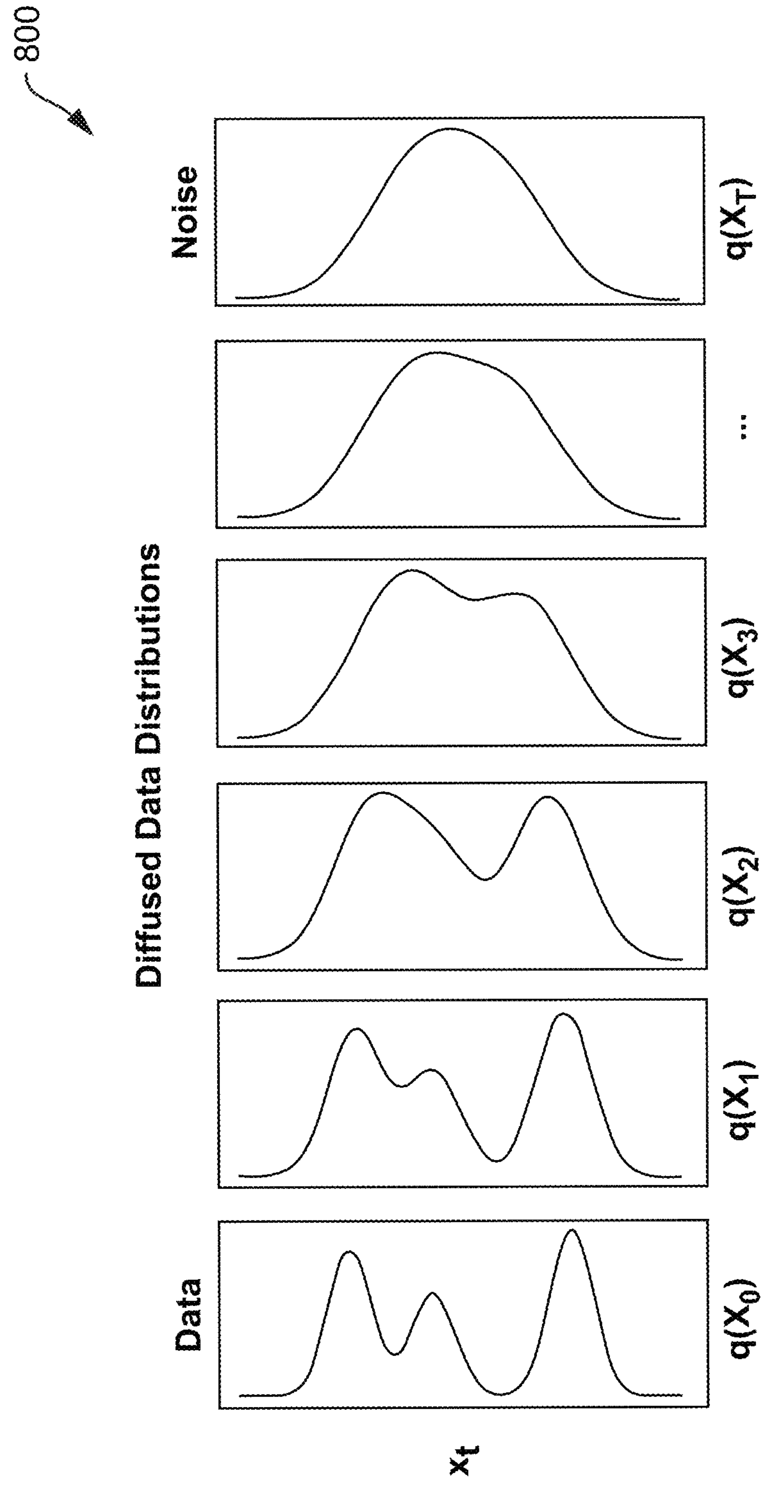
FIG. 8 is a diagram illustrating how diffusion data is distributed from initial data to noise using a diffusion model in the forward diffusion direction, in accordance with some aspects.

FIG. 8 is a diagram 800 illustrating how diffusion data is distributed from initial data to noise using a diffusion model in the forward diffusion direction, in accordance with some aspects. Note that the initial data $q(X_0)$ is detailed in the initial stage of the diffusion process. An illustrative example of the data $q(X_0)$ is the initial image of the vase shown in FIG. 7. As the diffusion model iterates and iteratively adds sampled noise to the data from t=0 to t=T, as shown in FIG. 8, the data becomes nosier and may ultimately result in pure noise (e.g., at $q(X_T)$). The example of FIG. 8 illustrates the progression of the data and how it becomes diffused with noise in the forward diffusion process.

In some aspects, the diffused data distribution (e.g., as shown in FIG. 8) can be as follows:

$$q(x_t) = \int q(x_0, x_t)dx_0 = \int q(x_0)q(x_t|x_0)dx_0.$$

In the above equation, $q(x_t)$ represents the diffused data distribution, $q(x_0, x_t)$ represents the joint distribution, $q(x_0)$ represents the input data distribution, and $q(x_t|x_o)$ is the diffusion kernel. In this regard, the model can sample $x_t \sim q(x_t)$ by first sampling $x_0 \sim q(x_0)$ and then sampling $x_t \sim q(x_t|x_0)$ (which may be referred to as ancestral sampling). The diffusion kernel takes the input and returns a vector or other data structure as output.

The following is a summary of a training algorithm and a sampling algorithm for a diffusion model. A training algorithm can include the following steps:

$$\nabla_\phi \left\| \epsilon - \epsilon_\phi \left(\sqrt{\hat{\alpha}_t\, x_0} + \sqrt{1-\hat{\alpha}_t}\, \epsilon, t\right)\right\|^2$$

A sampling algorithm can include the following steps:

1: $x_T \sim \mathcal{N}(0, I)$
2: for t = T, ... , 1 do
3: $z \sim \mathcal{N}(0, I)$
4: $x_{t-1} = \frac{1}{\sqrt{\hat{\alpha}_t}}\left(x_t - \frac{1-\hat{\alpha}_t}{\sqrt{1-\hat{\alpha}_t}} \epsilon_\phi (x_t, t)\right) + \sigma_t z$ -continued

```
5: end for
6: return x0
```

Figure 9:
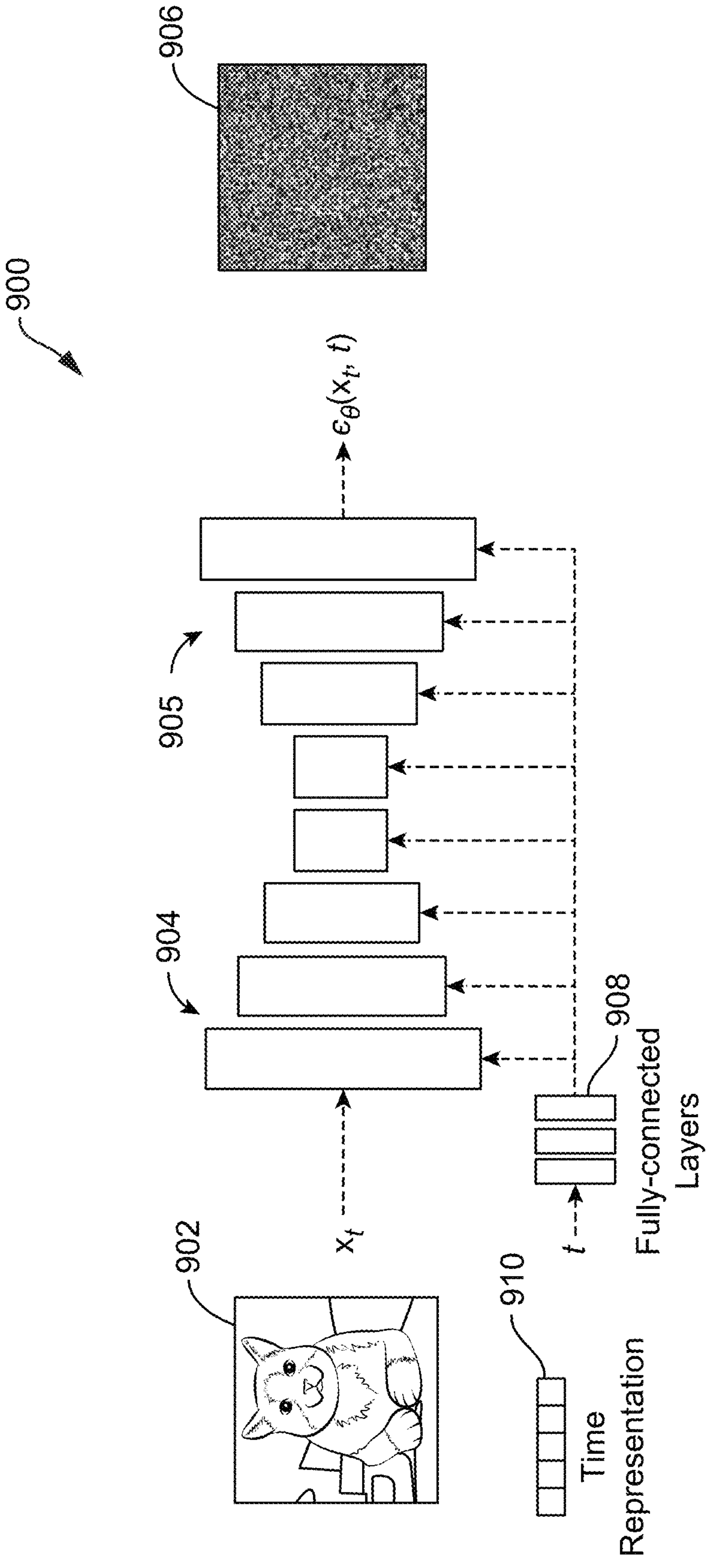
FIG. 9 is a diagram illustrating a U-Net architecture for a diffusion model, in accordance with some aspects.

FIG. 9 is a diagram illustrating a U-Net architecture 900 for a diffusion model, in accordance with some aspects. The initial image 902 (e.g., of a cat) is provided to the U-Net architecture 900 which includes a series of residual networks (ResNet) blocks and self-attention layers to represent the network ϵθ (xt, t). The U-Net architecture 900 also includes fully connected layers 908. In some cases, time representation 910 can be sinusoidal positional embeddings or random Fourier features. Noisy output 906 from the forward diffusion process is also shown.

The U-Net architecture 900 includes a contracting path 904 and an expansive path 905 as shown in FIG. 9, which gives it the U-shaped architecture. The contracting path 904 can be a convolutional network that includes repeated convolutional layers (that apply convolutional operations), each followed by a rectified linear unit (ReLU) and a max pooling operation. When images are being processed (e.g., the image 902) during the contracting path 904, the spatial information of the image 902 is reduced as features are generated. The expansive path 905 combines the features and spatial information through a sequence of up-convolutions and concatenations with high-resolution features from the contracting path 904. Some of the layers can be self-attention layers, which leverage global interactions between semantic features at the end of the encoder to explicitly model full contextual information.

Figure 10:
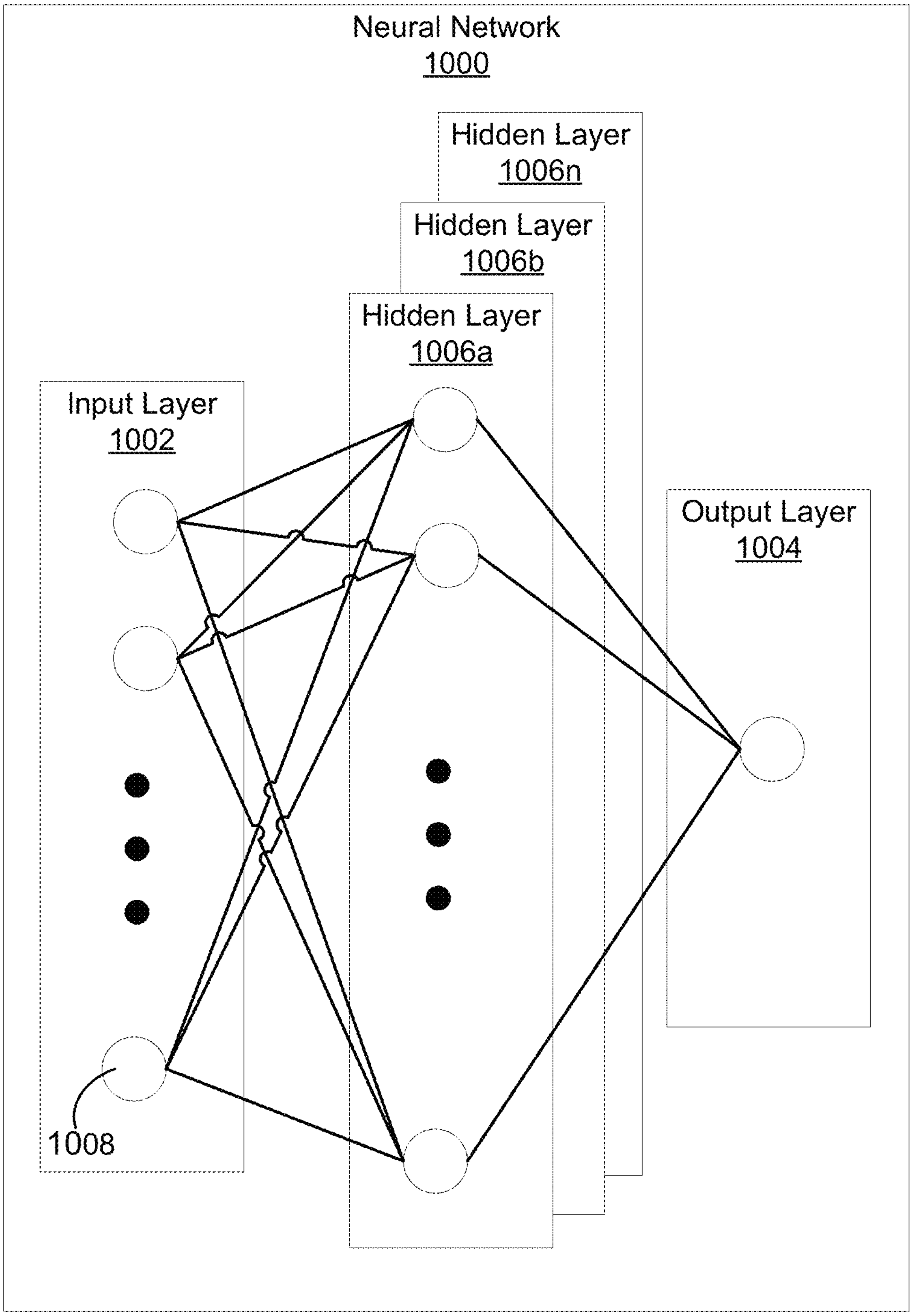
FIG. 10 is a block diagram illustrating an example of a deep learning neural network that can be used to implement a perception module and/or one or more validation modules, according to some aspects.

FIG. 10 is an illustrative example of a neural network 1000 (e.g., a deep-learning neural network) that can be used to implement machine-learning-based image generation, feature segmentation, implicit-neural-representation generation, rendering, classification, object detection, image recognition (e.g., face recognition, object recognition, scene recognition, etc.), feature extraction, authentication, gaze detection, gaze prediction, and/or automation.

An input layer 1002 includes input data. Neural network 1000 includes multiple hidden layers hidden layers 1006*a*, 1006*b*, through 1006*n*. The hidden layers 1006*a*, 1006*b*, through hidden layer 1006*n* include "n" number of hidden layers, where "n" is an integer greater than or equal to one. The number of hidden layers can be made to include as many layers as needed for the given application. Neural network 1000 further includes an output layer 1004 that provides an output resulting from the processing performed by the hidden layers 1006*a*, 1006*b*, through 1006*n*.

Neural network 1000 may be, or may include, a multi-layer neural network of interconnected nodes. Each node can represent a piece of information. Information associated with the nodes is shared among the different layers and each layer retains information as information is processed. In some cases, neural network 1000 can include a feed-forward network, in which case there are no feedback connections where outputs of the network are fed back into itself. In some cases, neural network 1000 can include a recurrent neural network, which can have loops that allow information to be carried across nodes while reading in input.

Information can be exchanged between nodes through node-to-node interconnections between the various layers. Nodes of input layer 1002 can activate a set of nodes in the first hidden layer 1006*a*. For example, as shown, each of the input nodes of input layer 1002 is connected to each of the nodes of the first hidden layer 1006*a*. The nodes of first hidden layer 1006*a* can transform the information of each input node by applying activation functions to the input node information. The information derived from the transformation can then be passed to and can activate the nodes of the next hidden layer 1006*b*, which can perform their own designated functions. Example functions include convolutional, up-sampling, data transformation, and/or any other suitable functions. The output of the hidden layer 1006*b* can then activate nodes of the next hidden layer, and so on. The output of the last hidden layer 1006*n* can activate one or more nodes of the output layer 1004, at which an output is provided. In some cases, while nodes (e.g., node 1008) in neural network 1000 are shown as having multiple output lines, a node has a single output and all lines shown as being output from a node represent the same output value.

In some cases, each node or interconnection between nodes can have a weight that is a set of parameters derived from the training of neural network 1000. Once neural network 1000 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 1000 to be adaptive to inputs and able to learn as more and more data is processed.

Neural network 1000 may be pre-trained to process the features from the data in the input layer 1002 using the different hidden layers 1006*a*, 1006*b*, through 1006*n* in order to provide the output through the output layer 1004. In an example in which neural network 1000 is used to identify features in images, neural network 1000 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 1000 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until neural network 1000 is trained well enough so that the weights of the layers are accurately tuned.

For the example of identifying objects in images, the forward pass can include passing a training image through neural network 1000. The weights are initially randomized before neural network 1000 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 1000, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 1000 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $$E_{total} = \sum \frac{1}{2}(\text{target} - \text{output})^2.$$

The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 1000 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and f denotes a learning rate. The learning rate can be set to any suitable value, with a high learning rate including larger weight updates and a lower value indicating smaller weight updates.

Neural network 1000 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 1000 can include any other deep network other than a CNN, such as an autoencoder, a deep belief nets (DBNs), a Recurrent Neural Networks (RNNs), among others.

Figure 11:
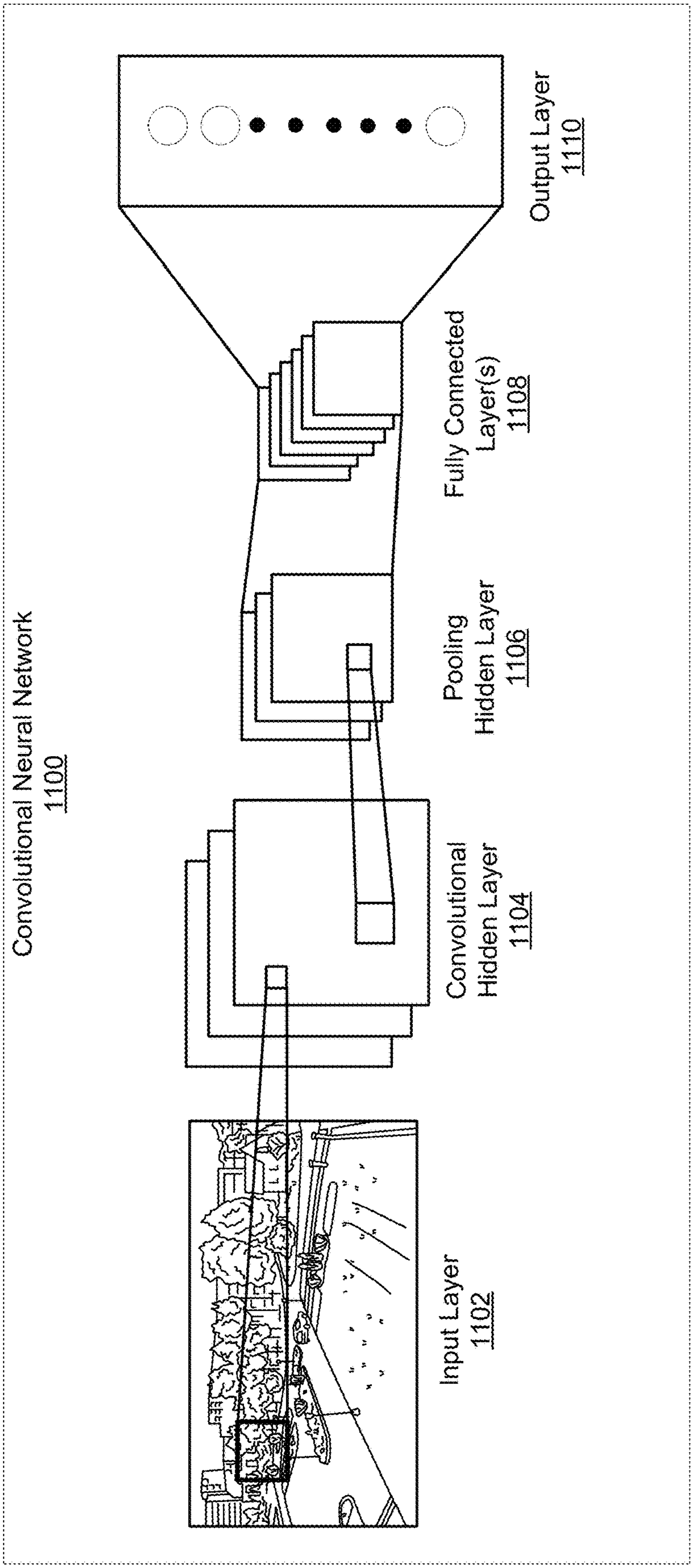
FIG. 11 is a block diagram illustrating an example of a convolutional neural network (CNN), according to various aspects of the present disclosure.

FIG. 11 is an illustrative example of a convolutional neural network (CNN) 1100. The input layer 1102 of the CNN 1100 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1104, an optional non-linear activation layer, a pooling hidden layer 1106, and fully connected layer 1108 (which fully connected layer 1108 can be hidden) to get an output at the output layer 1110. While only one of each hidden layer is shown in FIG. 11, one of ordinary skill will appreciate that multiple convolutional hidden layers, non-linear layers, pooling hidden layers, and/or fully connected layers can be included in the CNN 1100. As previously described, the output can indicate a single class of an object or can include a probability of classes that best describe the object in the image.

The first layer of the CNN 1100 can be the convolutional hidden layer 1104. The convolutional hidden layer 1104 can analyze image data of the input layer 1102. Each node of the convolutional hidden layer 1104 is connected to a region of nodes (pixels) of the input image called a receptive field. The convolutional hidden layer 1104 can be considered as one or more filters (each filter corresponding to a different activation or feature map), with each convolutional iteration of a filter being a node or neuron of the convolutional hidden layer 1104. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1104. Each connection between a node and a receptive field for that node learns a weight and, in some cases, an overall bias such that each node learns to analyze its particular local receptive field in the input image. Each node of the convolutional hidden layer 1104 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1104 is due to each node of the convolutional layer being applied to its corresponding receptive field. For example, a filter of the convolutional hidden layer 1104 can begin in the top-left corner of the input image array and can convolve around the input image. As noted above, each convolutional iteration of the filter can be considered a node or neuron of the convolutional hidden layer 1104. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1104. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1104.

The mapping from the input layer to the convolutional hidden layer 1104 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1104 can include several activation maps in order to identify multiple features in an image. The example shown in FIG. 11 includes three activation maps. Using three activation maps, the convolutional hidden layer 1104 can detect three different kinds of features, with each feature being detectable across the entire image.

In some examples, a non-linear hidden layer can be applied after the convolutional hidden layer 1104. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 1100 without affecting the receptive fields of the convolutional hidden layer 1104.

The pooling hidden layer 1106 can be applied after the convolutional hidden layer 1104 (and after the non-linear hidden layer when used). The pooling hidden layer 1106 is used to simplify the information in the output from the convolutional hidden layer 1104. For example, the pooling hidden layer 1106 can take each activation map output from the convolutional hidden layer 1104 and generates a condensed activation map (or feature map) using a pooling function. Max-pooling is one example of a function performed by a pooling hidden layer. Other forms of pooling functions be used by the pooling hidden layer 1106, such as average pooling, L2-norm pooling, or other suitable pooling functions. A pooling function (e.g., a max-pooling filter, an L2-norm filter, or other suitable pooling filter) is applied to each activation map included in the convolutional hidden layer 1104. In the example shown in FIG. 11, three pooling filters are used for the three activation maps in the convolutional hidden layer 1104.

In some examples, max-pooling can be used by applying a max-pooling filter (e.g., having a size of 2×2) with a stride (e.g., equal to a dimension of the filter, such as a stride of 2) to an activation map output from the convolutional hidden layer 1104. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1104 having a dimension of 24×24 nodes, the output from the pooling hidden layer 1106 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1100.

The final layer of connections in the network is a fully-connected layer that connects every node from the pooling hidden layer 1106 to every one of the output nodes in the output layer 1110. Using the example above, the input layer includes 28×28 nodes encoding the pixel intensities of the input image, the convolutional hidden layer 1104 includes 3×24×24 hidden feature nodes based on application of a 5×5 local receptive field (for the filters) to three activation maps, and the pooling hidden layer 1106 includes a layer of 3×12×12 hidden feature nodes based on application of max-pooling filter to 2×2 regions across each of the three feature maps. Extending this example, the output layer 1110 can include ten output nodes. In such an example, every node of the 3×12×12 pooling hidden layer 1106 is connected to every node of the output layer 1110.

The fully connected layer 1108 can obtain the output of the previous pooling hidden layer 1106 (which should represent the activation maps of high-level features) and determines the features that most correlate to a particular class. For example, the fully connected layer 1108 can determine the high-level features that most strongly correlate to a particular class and can include weights (nodes) for the high-level features. A product can be computed between the weights of the fully connected layer 1108 and the pooling hidden layer 1106 to obtain probabilities for the different classes. For example, if the CNN 1100 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1110 can include an M-dimensional vector (in the prior example, M=10). M indicates the number of classes that the CNN 1100 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 12:
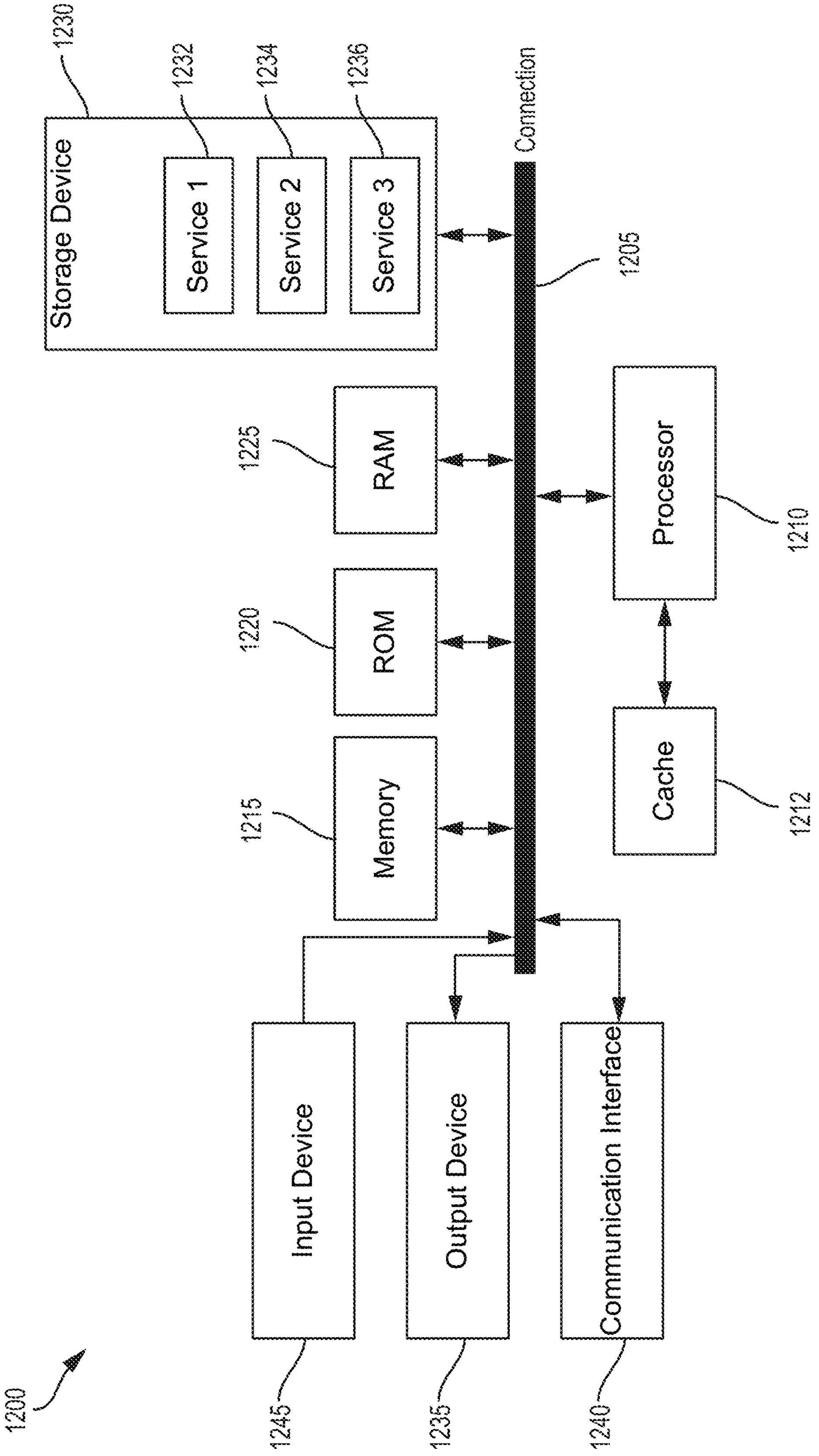
FIG. 12 illustrates an example computing device architecture of an example computing device which can implement the various techniques described herein.

FIG. 12 illustrates an example computing device architecture 1200 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 1200 are shown in electrical communication with each other using connection 1205, such as a bus. The example computing device architecture 1200 includes a processing unit (CPU or processor) 1210 and computing device connection 1205 that couples various computing device components including computing device memory 1215, such as read only memory (ROM) 1220 and random access memory (RAM) 1225, to processor 1210.

Computing device architecture 1200 can include a cache of high-speed memory connected directly with, in close proximity to, or integrated as part of processor 1210. Computing device architecture 1200 can copy data from memory 1215 and/or the storage device 1230 to cache 1212 for quick access by processor 1210. In this way, the cache can provide a performance boost that avoids processor 1210 delays while waiting for data. These and other modules can control or be configured to control processor 1210 to perform various actions. Other computing device memory 1215 may be available for use as well. Memory 1215 can include multiple different types of memory with different performance characteristics. Processor 1210 can include any general purpose processor and a hardware or software service, such as service 1 1232, service 2 1234, and service 3 1236 stored in storage device 1230, configured to control processor 1210 as well as a special-purpose processor where software instructions are incorporated into the processor design. Processor 1210 may be a self-contained system, containing multiple cores or processors, a bus, memory controller, cache, etc. A multi-core processor may be symmetric or asymmetric.

To enable user interaction with the computing device architecture 1200, input device 1245 can represent any number of input mechanisms, such as a microphone for speech, a touch-sensitive screen for gesture or graphical input, keyboard, mouse, motion input, speech and so forth. Output device 1235 can also be one or more of a number of output mechanisms known to those of skill in the art, such as a display, projector, television, speaker device, etc. In some instances, multimodal computing devices can enable a user to provide multiple types of input to communicate with computing device architecture 1200. Communication interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. Storage device 1230 can include services 1232, 1234, 1236 for controlling processor 1210. Other hardware or software modules are contemplated. Storage device 1230 can be connected to the computing device connection 1205. In one aspect, a hardware module that performs a particular function can include the software component stored in a computer-readable medium in connection with the necessary hardware components, such as processor 1210, connection 1205, output device 1235, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data.

A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors or other suitable electronic circuits) to perform the operation, or any combination thereof.

The phrase "coupled to" refers to any component that is physically connected to another component either directly or indirectly and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the Disclosure Include:

Aspect 1. An apparatus for adapting a pretrained machine learning model, comprising: one or more memories configured to store a training image; and one or more processors coupled to the one or more memories and configured to: encode the training image into a first feature vector, the training image including a first object located at a first location; generate a second feature vector based on a set of sinusoidal functions using a set of weights; combine the first feature vector with a second feature vector to generate a combined feature vector; process the combined feature vector using a visual language model to obtain a second location for the first object; and adjust the set of weights based on a comparison between the first location and the second location.

Aspect 2. The apparatus of Aspect 1, wherein the set of sinusoidal functions include a cosine function and a sine function.

Aspect 3. The apparatus of any of Aspects 1-2, wherein the second location comprises textual coordinates for a bounding box.

Aspect 4. The apparatus of any of Aspects 1-3, wherein the combined feature vector and a textual prompt are processed using the visual language model to obtain the second location for the first object.

Aspect 5. The apparatus of Aspect 4, wherein the textual prompt comprises a prompt for a location of the first object.

Aspect 6. The apparatus of any of Aspects 1-5, wherein the one or more processors is further configured to generate the training image.

Aspect 7. The apparatus of Aspect 6, wherein, to generate the training image, the one or more processors is configured to insert the first object into a background image.

Aspect 8. The apparatus of Aspect 7, wherein, to generate the training image, the one or more processors is configured to generate an image of the first object.

Aspect 9. The apparatus of Aspect 8, wherein, to generate the image of the first object, the one or more processors is configured to submit an object prompt to a text-to-image generation model.

Aspect 10. The apparatus of any of Aspects 6-8, wherein weights of the visual language model are frozen.

Aspect 11. The apparatus of any of Aspects 1-10, wherein the at least one processor is configured to adjust the set of weights based on on-device training of a machine learning system.

Aspect 12. An apparatus for image processing, comprising: one or more memories configured to store an image; and one or more processors coupled to the one or more memories and configured to: process the image and a first textual prompt using a visual language model to obtain a list of objects in the image; process the image and a second textual prompt using an adapted visual language model, the second textual prompt including a first object from the list of objects; and receive a set of coordinates for the first object in the image.

Aspect 13. The apparatus of Aspect 12, wherein the first textual prompt comprises a prompt for a list of objects in the image.

Aspect 14. The apparatus of any of Aspects 12-13, wherein the second textual prompt comprises a prompt for a location of the first object.

Aspect 15. The apparatus of any of Aspects 11-14, wherein the visual language model and the adapted visual language model are a same machine language model.

Aspect 16. The apparatus of any of Aspects 11-15, wherein weights of the visual language model are frozen.

Aspect 17. The apparatus of any of Aspects 11-16, further comprising a camera configured to capture the image.

Aspect 18. A method for adapting a pretrained machine learning model, comprising: encoding a training image into a first feature vector, the training image including a first object located at a first location; generating a second feature vector based on a set of sinusoidal functions using a set of weights; combining the first feature vector with a second feature vector to generate a combined feature vector; processing the combined feature vector using a visual language model to obtain a second location for the first object; and adjusting the set of weights based on a comparison between the first location and the second location.

Aspect 19. The method of Aspect 18, wherein the set of sinusoidal functions include a cosine function and a sine function.

Aspect 20. The method of any of Aspects 18-19, wherein the second location comprises textual coordinates for a bounding box.

Aspect 21. The method of any of Aspects 18-20, wherein the combined feature vector and a textual prompt are processed using the visual language model to obtain the second location for the first object.

Aspect 22. The method of Aspect 21, wherein the textual prompt comprises a prompt for a location of the first object.

Aspect 23. The method of any of Aspects 18-22, further comprising generating the training image.

Aspect 24. The method of Aspect 23, wherein generating the training image comprises inserting the first object into a background image.

Aspect 25. The method of Aspect 24, wherein generating the training image further comprises generating an image of the first object.

Aspect 26. The method of Aspect 25, wherein the image of the first object is generated by submitting an object prompt to a text-to-image generation model.

Aspect 27. The method of any of Aspects 23-26, wherein weights of the visual language model are frozen.

Aspect 28. A method for image processing, comprising: processing an image and a first textual prompt using a visual language model to obtain a list of objects in the image; processing the image and a second textual prompt using an adapted visual language model, the second textual prompt including a first object from the list of objects; and receiving a set of coordinates for the first object in the image.

Aspect 29. The method of Aspect 28, wherein the first textual prompt comprises a prompt for a list of objects in the image.

Aspect 30. The method of any of Aspects 28-29, wherein the second textual prompt comprises a prompt for a location of the first object.

Aspect 31. The method of any of Aspects 28-30, wherein the visual language model and the adapted visual language model are a same machine language model.

Aspect 32. The method of any of Aspects 28-31, wherein weights of the visual language model are frozen.

Aspect 33. A non-transitory computer-readable medium having stored thereon instructions that, when executed by one or more processors, cause the one or more processors to: encode a training image into a first feature vector, the training image including a first object located at a first location; generate a second feature vector based on a set of sinusoidal functions using a set of weights; combine the first feature vector with a second feature vector to generate a combined feature vector; process the combined feature vector using a visual language model to obtain a second location for the first object; and adjust the set of weights based on a comparison between the first location and the second location.

Aspect 34. The non-transitory computer-readable medium of Aspect 33, wherein the set of sinusoidal functions include a cosine function and a sine function.

Aspect 35. The non-transitory computer-readable medium of any of Aspects 33-34, wherein the second location comprises textual coordinates for a bounding box.

Aspect 36. The non-transitory computer-readable medium of any of Aspects 33-35, wherein the combined feature vector and a textual prompt are processed using the visual language model to obtain the second location for the first object.

Aspect 37. The non-transitory computer-readable medium of Aspect 35, wherein the textual prompt comprises a prompt for a location of the first object.

Aspect 38. The non-transitory computer-readable medium of any of Aspects 33-37, wherein the instructions cause the one or more processors to generate the training image.

Aspect 39. The non-transitory computer-readable medium of Aspect 38, wherein, to generate the training image, the instructions cause the one or more processors to insert the first object into a background image.

Aspect 40. The non-transitory computer-readable medium of Aspect 39, wherein, to generate the training image, the instructions cause the one or more processors to generate an image of the first object.

Aspect 41. The non-transitory computer-readable medium of Aspect 40, wherein, to generate the image of the first object, the instructions cause the one or more processors to submit an object prompt to a text-to-image generation model.

Aspect 42. The non-transitory computer-readable medium of any of Aspects 38-41, wherein weights of the visual language model are frozen.

Aspect 43. A non-transitory computer-readable medium having stored thereon instructions that, when executed by one or more processors, cause the one or more processors to: process an image and a first textual prompt using a visual language model to obtain a list of objects in the image; process the image and a second textual prompt using an adapted visual language model, the second textual prompt including a first object from the list of objects; and receive a set of coordinates for the first object in the image.

Aspect 44. The non-transitory computer-readable medium of Aspect 43, wherein the first textual prompt comprises a prompt for a list of objects in the image.

Aspect 45. The non-transitory computer-readable medium of any of Aspects 43-44, wherein the second textual prompt comprises a prompt for a location of the first object.

Aspect 46. The non-transitory computer-readable medium of any of Aspects 43-45, wherein the visual language model and the adapted visual language model are a same machine language model.

Aspect 47. The non-transitory computer-readable medium of any of Aspects 43-46, wherein weights of the visual language model are frozen.

Aspect 48: An apparatus comprising one or more means for performing operations according to any one or more of Aspects 18-27.

Aspect 49: An apparatus comprising one or more means for performing operations according to any one or more of Aspects 28-32.

What is claimed is:

1. An apparatus for adapting a pretrained machine learning model, comprising:

one or more memories configured to store a training image; and one or more processors coupled to the one or more memories and configured to:

encode the training image into a first feature vector, the training image including a first object located at a first location;

generate a second feature vector based on a set of sinusoidal functions using a set of weights;

combine the first feature vector with a second feature vector to generate a combined feature vector;

process the combined feature vector using a visual language model to obtain a second location for the first object; and adjust the set of weights based on a comparison between the first location and the second location.

2. The apparatus of claim 1, wherein the set of sinusoidal functions include a cosine function and a sine function.

3. The apparatus of claim 1, wherein the second location comprises textual coordinates for a bounding box.

4. The apparatus of claim 1, wherein the combined feature vector and a textual prompt are processed using the visual language model to obtain the second location for the first object.

5. The apparatus of claim 4, wherein the textual prompt comprises a prompt for a location of the first object.

6. The apparatus of claim 1, wherein the one or more processors are configured to generate the training image.

7. The apparatus of claim 6, wherein, to generate the training image, the one or more processors are configured to insert the first object into a background image.

8. The apparatus of claim 7, wherein, to generate the training image, the one or more processors are configured to generate an image of the first object.

9. The apparatus of claim 8, wherein, to generate the image of the first object, the one or more processors are configured to submit an object prompt to a text-to-image generation model.

10. The apparatus of claim 6, wherein weights of the visual language model are frozen.

11. The apparatus of claim 1, wherein the one or more processors are configured to adjust the set of weights based on on-device training of a machine learning system.

12. The apparatus of claim 1, further comprising a camera configured to capture the training image.

13. The apparatus of claim 1, further comprising a display configured to display an output of the pretrained machine learning model.

14. An apparatus for image processing, comprising:

one or more memories configured to store an image; and one or more processors coupled to the one or more memories and configured to:

process the image and a first textual prompt using a visual language model to obtain a list of objects in the image;

process the image and a second textual prompt using an adapted visual language model, the second textual prompt including a first object from the list of objects; and receive a set of coordinates for the first object in the image.

15. The apparatus of claim 14, wherein the first textual prompt comprises a prompt for a list of objects in the image.

16. The apparatus of claim 14, wherein the second textual prompt comprises a prompt for a location of the first object.

17. The apparatus of claim 14, wherein the visual language model and the adapted visual language model are a same machine language model.

18. The apparatus of claim 14, wherein weights of the visual language model are frozen.

19. The apparatus of claim 14, further comprising a camera configured to capture the image.

20. The apparatus of claim 14, wherein the set of coordinates for the first object comprise a bounding box for the first object.

* * * * *